United States Patent
Uruma (10) Patent No.: US 10,158,781 B2
(45) Date of Patent: Dec. 18, 2018

(54) IMAGE TRANSMISSION APPARATUS CAPABLE OF ENSURING VISIBILITY WHEN CONTENT OF TRANSMISSION IS CHECKED, CONTROL METHOD THEREFOR, AND STORAGE MEDIUM

(71) Applicant: CANON KABUSHIKI KAISHA, Tokyo (JP)

(72) Inventor: Kazuhiro Uruma, Moriya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 183 days.

(21) Appl. No.: 15/189,029

(22) Filed: Jun. 22, 2016

(65) Prior Publication Data
US 2017/0006179 A1    Jan. 5, 2017

(30) Foreign Application Priority Data
Jul. 3, 2015 (JP) .................. 2015-134431

(51) Int. Cl.
*H04N 1/04* (2006.01)
*H04N 1/21* (2006.01)

(52) U.S. Cl.
CPC ... *H04N 1/2179* (2013.01); *H04N 2201/0093* (2013.01); *H04N 2201/3202* (2013.01); *H04N 2201/3288* (2013.01)

(58) Field of Classification Search
CPC ....... H04N 2201/3202; H04N 1/32112; H04N 2201/0093; H04N 1/00347; H04N 1/00122; H04N 1/0097; H04N 1/32085; H04N 1/32096; H04N 1/32368; H04N 2201/0015; H04N 2201/0087; H04N 2201/0089; H04N 2201/3204; H04N 2201/3222; H04N 2201/3225; H04N 2201/3226; H04N 2201/3274; H04N 2201/3278; H04N 2201/3295; H04N 1/00204; H04N 1/00206; H04N 1/00209; H04N 1/0035; H04N 1/00403; H04N 1/00411; H04N 1/00416; H04N 1/00424; H04N 1/00432; H04N 1/00474; H04N 1/00482; H04N 1/2179; H04N 1/324; H04N 1/32411;

(Continued)

(56) References Cited

U.S. PATENT DOCUMENTS 5,552,901 A * 9/1996 Kikuchi ............ H04N 1/00204
358/442
6,359,707 B1 * 3/2002 Tadokoro ................. H04N 1/46
358/405

(Continued)

FOREIGN PATENT DOCUMENTS

JP        2004356849 A    12/2004

*Primary Examiner* — Negussie Worku
(74) *Attorney, Agent, or Firm* — Rossi, Kimms & McDowell LLP (57) ABSTRACT

An image transmission apparatus which is capable of, even in the case of broadcasting, ensuring visibility when the content of transmission is checked. Image data is transmitted to one or more designated destinations. A file name is generated from the image data. The generated file is stored as a history. A file name including a certain destination among the plurality of designated destination, information for a user to recognize whether a plurality of designation is designated and an identification number of a job is set as a file name of the file.

11 Claims, 7 Drawing Sheets

(58) Field of Classification Search
CPC ............. H04N 1/32771; H04N 1/3278; H04N 2201/0039; H04N 2201/0067; H04N 2201/0074; H04N 2201/3205; H04N 2201/3214; H04N 2201/3215; H04N 2201/3223; H04N 2201/3288; G06F 17/2247; G06F 17/272; G06F 17/2264; G06F 17/30569; G06F 17/30; G06F 17/30967; G06F 9/4443
USPC .............. 358/401, 402, 403, 407, 442, 468; 709/217, 202, 205, 206, 218, 228, 245; 379/100.01
See application file for complete search history.

(56) References Cited

U.S. PATENT DOCUMENTS

| | | | | |
|---|---|---|---|---|
| 9,137,410 | B2* | 9/2015 | Yamazaki | H04N 1/32112 |
| 9,338,313 | B2* | 5/2016 | Noguchi | H04N 1/00347 |
| 2006/0007469 | A1* | 1/2006 | Uruma | H04N 1/0035 |
| | | | | 358/1.14 |
| 2008/0259385 | A1* | 10/2008 | Uruma | G06F 21/608 |
| | | | | 358/1.15 |
| 2009/0187665 | A1* | 7/2009 | Ozawa | G06F 17/30 |
| | | | | 709/228 |
| 2011/0035671 | A1* | 2/2011 | Iwai | H04N 1/00347 |
| | | | | 715/728 |
| 2011/0216329 | A1* | 9/2011 | Uruma | H04N 1/33315 |
| | | | | 358/1.2 |
| 2013/0120789 | A1* | 5/2013 | Uruma | H04N 1/00206 |
| | | | | 358/1.15 |
| 2013/0339591 | A1* | 12/2013 | Takahashi | G06F 11/3006 |
| | | | | 711/104 |
| 2015/0116785 | A1* | 4/2015 | Yamazaki | H04N 1/32112 |
| | | | | 358/402 |
| 2015/0172474 | A1* | 6/2015 | Uruma | H04N 1/32702 |
| | | | | 358/1.15 |
| 2015/0220661 | A1* | 8/2015 | Nanaumi | H04L 67/10 |
| | | | | 707/722 |

* cited by examiner

| 401 | 402 | 403 | 404 | 405 | 406 | 407 | 408 | 409 400 |
|---|---|---|---|---|---|---|---|---|
| USER NAME | TRANSMISSION DATE AND TIM | COMMU-NICATION TIME | GROUP ADDRESS NAME | DESTINATION ADDRESS | JOB IDENTIFICATION NUMBER | COMMU-NICATION MODE | SHEET COUNT | COMMUNICATION RESULT (ERROR CODE) |
| User1 | 2015/3/1 9:23 | 40 | | 04411112222 | 0001 | 2 | 1 | 0 |
| User1 | 2015/3/1 9:24 | 50 | | 04411113333 | 0001 | 2 | 1 | 0 |
| User1 | 2015/3/1 9:25 | 60 | | 04411114444 | 0001 | 2 | 1 | 0 |
| User2 | 2015/3/1 10:21 | 54 | AREA1 CUSTOMER | 04411110001 | 0002 | 2 | 1 | 10755 |
| User2 | 2015/3/1 10:22 | 55 | AREA1 CUSTOMER | 04411110002 | 0002 | 2 | 5 | 0 |
| User2 | 2015/3/1 10:23 | 57 | AREA1 CUSTOMER | 04411110003 | 0002 | 2 | 5 | 0 |
| User2 | 2015/3/1 10:24 | 55 | AREA1 CUSTOMER | 04411110004 | 0002 | 2 | 5 | 0 |
| User2 | 2015/3/1 10:25 | 55 | AREA1 CUSTOMER | 04411110005 | 0002 | 2 | 5 | 0 |
| User2 | 2015/3/1 10:26 | 58 | AREA1 CUSTOMER | 04411110006 | 0002 | 2 | 5 | 0 |
| User2 | 2015/3/1 10:27 | 55 | AREA1 CUSTOMER | 04411110007 | 0002 | 2 | 5 | 0 |
| User2 | 2015/3/1 10:28 | 55 | AREA1 CUSTOMER | 04411110008 | 0002 | 2 | 5 | 0 |
| User2 | 2015/3/1 10:29 | 56 | AREA1 CUSTOMER | 04411110009 | 0002 | 2 | 2 | 10755 |
| User2 | 2015/3/1 10:31 | 55 | AREA1 CUSTOMER | 04411110010 | 0002 | 2 | 5 | 0 |
| User2 | 2015/3/1 10:32 | 55 | AREA1 CUSTOMER | 04411110011 | 0002 | 2 | 5 | 0 |
| User2 | 2015/3/1 10:33 | 55 | AREA1 CUSTOMER | 04411110012 | 0002 | 2 | 5 | 0 |
| User2 | 2015/3/1 10:34 | 60 | AREA1 CUSTOMER | 04411110013 | 0002 | 2 | 3 | 10755 |
| User3 | 2015/3/1 12:12 | 55 | | 04411118888 | 0003 | 1 | 1 | 0 |
| User4 | 2015/3/1 13:13 | 40 | | 04411119999 | 0004 | 1 | 1 | 10755 |

FIG. 5

| STARTING TIME | DESTINATION ADDRESS | RECEPTION NUMBER | COMMUNICATION MODE | SHEET COUNT | COMMU- NICATION RESULT | ERROR CODE |
|---|---|---|---|---|---|---|
| 2015/3/1 9:23 | 0441112222 | 0001 | BROADCASTING | 1 | OK | |
| 2015/3/1 9:24 | 0441113333 | 0001 | BROADCASTING | 1 | OK | |
| 2015/3/1 9:25 | 0441114444 | 0001 | BROADCASTING | 1 | NG | ##755 |
| 2015/3/1 10:21 | 0441110001 | 0002 | BROADCASTING | 5 | OK | |
| 2015/3/1 10:22 | 0441110002 | 0002 | BROADCASTING | 5 | OK | |
| 2015/3/1 10:23 | 0441110003 | 0002 | BROADCASTING | 5 | OK | |
| 2015/3/1 10:24 | 0441110004 | 0002 | BROADCASTING | 5 | OK | |
| 2015/3/1 10:25 | 0441110005 | 0002 | BROADCASTING | 5 | OK | |
| 2015/3/1 10:26 | 0441110006 | 0002 | BROADCASTING | 5 | OK | |
| 2015/3/1 10:27 | 0441110007 | 0002 | BROADCASTING | 5 | OK | |
| 2015/3/1 10:28 | 0441110008 | 0002 | BROADCASTING | 5 | OK | |
| 2015/3/1 10:29 | 0441110009 | 0002 | BROADCASTING | 2 | NG | ##755 |
| 2015/3/1 10:31 | 0441110010 | 0002 | BROADCASTING | 5 | OK | |
| 2015/3/1 10:32 | 0441110011 | 0002 | BROADCASTING | 5 | OK | |
| 2015/3/1 10:33 | 0441110012 | 0002 | BROADCASTING | 5 | OK | |
| 2015/3/1 10:34 | 0441110013 | 0002 | BROADCASTING | 3 | NG | ##755 |
| 2015/3/1 12:12 | 0441118888 | 0003 | TRANSMISSION | 1 | OK | |
| 2015/3/1 13:13 | 0441119999 | 0004 | TRANSMISSION | 1 | NG | ##755 |

IMAGE TRANSMISSION APPARATUS CAPABLE OF ENSURING VISIBILITY WHEN CONTENT OF TRANSMISSION IS CHECKED, CONTROL METHOD THEREFOR, AND STORAGE MEDIUM

BACKGROUND OF THE INVENTION

Field of the Invention

The present invention relates to an image transmission apparatus and a control method therefor which are capable of storing faxed image data and history information as a file in a destination to save such as a file server, as well as a storage medium.

Description of the Related Art

Conventionally, when a document transmitted by facsimile is desired to be preserved, it can be saved by broadcasting it to a network-connected file server when transmitting it by facsimile. By checking image data in a file saved in the file server, a user knows what kind of data has been transmitted by facsimile.

Japanese Laid-Open Patent Publication (Kokai) No. 2004-356849 discloses an image communication apparatus which saves (logs) a document, which has been transmitted by facsimile, in a file server for the sake of backup. First, this image communication apparatus transmits a document based on facsimile transmission data received from a host. Next, at the end of facsimile transmission, the image communication apparatus generates a file with a file name including sender information and destination information added to the facsimile transmission data. Then, the image communication apparatus transmits the generated file to the file server to save it.

In Japanese Laid-Open Patent Publication (Kokai) No. 2004-356849, however, no mention is made of how to generate a file name when broadcasting a file to multiple addresses. Thus, at the time of broadcasting, multiple destinations are included in a generated file name, making the file name too long and degrading visibility when the content of transmission is checked. Moreover, it may be difficult to find a desired transmission history only with the help of information on a transmission destination.

SUMMARY OF THE INVENTION

The present invention provides an image transmission apparatus and a control method therefor, which are capable of, even in the case of broadcasting, ensuring visibility when the content of transmission is checked, as well as a storage medium.

Accordingly, the present invention provides an image transmission apparatus comprising a designation unit configured to designate a destination, the designation unit being able to designate a plurality of destination, a transmission unit configured to transmit image data to the destination designated by the designation unit, a generating unit configured to generate a file from the image data, a storing unit configured to store the file generated by the generating unit as a history, and a setting unit configured to set a file name including a certain destination among the plurality of destinations designated by the designation unit, information for a user to recognize whether a plurality of destinations is designated by the designation unit, and an identification number of a job as a file name of the file.

According to the present invention, even in the case of broadcasting, visibility is ensured when the content of transmission is checked.

Further features of the present invention will become apparent from the following description of exemplary embodiments (with reference to the attached drawings).

DESCRIPTION OF THE EMBODIMENTS

Hereafter, an embodiment of the present invention will be described with reference to the drawings.

Figure 1:
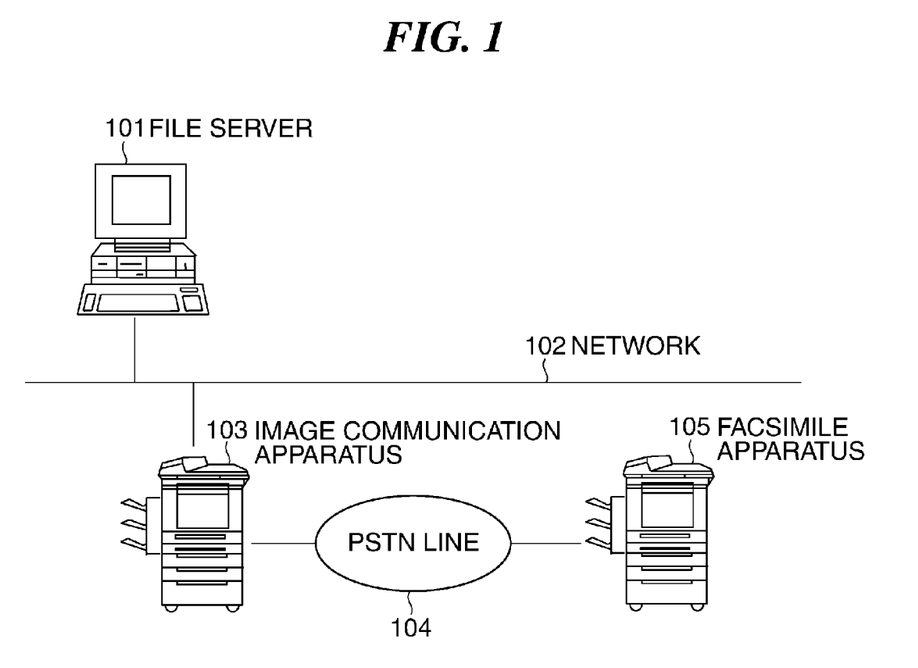
FIG. 1 is a diagram schematically showing an arrangement of a communication network system including an image communication apparatus.

FIG. 1 is a diagram schematically showing an arrangement of a communication network system including an image communication apparatus as an image transmission apparatus according to the embodiment of the present invention. This communication network system is constructed such that the image communication apparatus 103 and a file server 101 are connected together so that they can communicate with each other via a network 102. The file server 101 is a computer capable of transmitting and receiving documents via the network 102. The image communication apparatus 103 is configured as, for example, a facsimile apparatus capable of transmitting and receiving facsimiles. Specifically, the image communication apparatus 103 is connected to a PSTN line 104 and capable of transmitting and receiving facsimiles to and from a facsimile apparatus 105 via the PSTN line 104. The number of facsimile apparatuses 105 which communicate with the image communication apparatus 103 is not limited to one.

Figure 2:
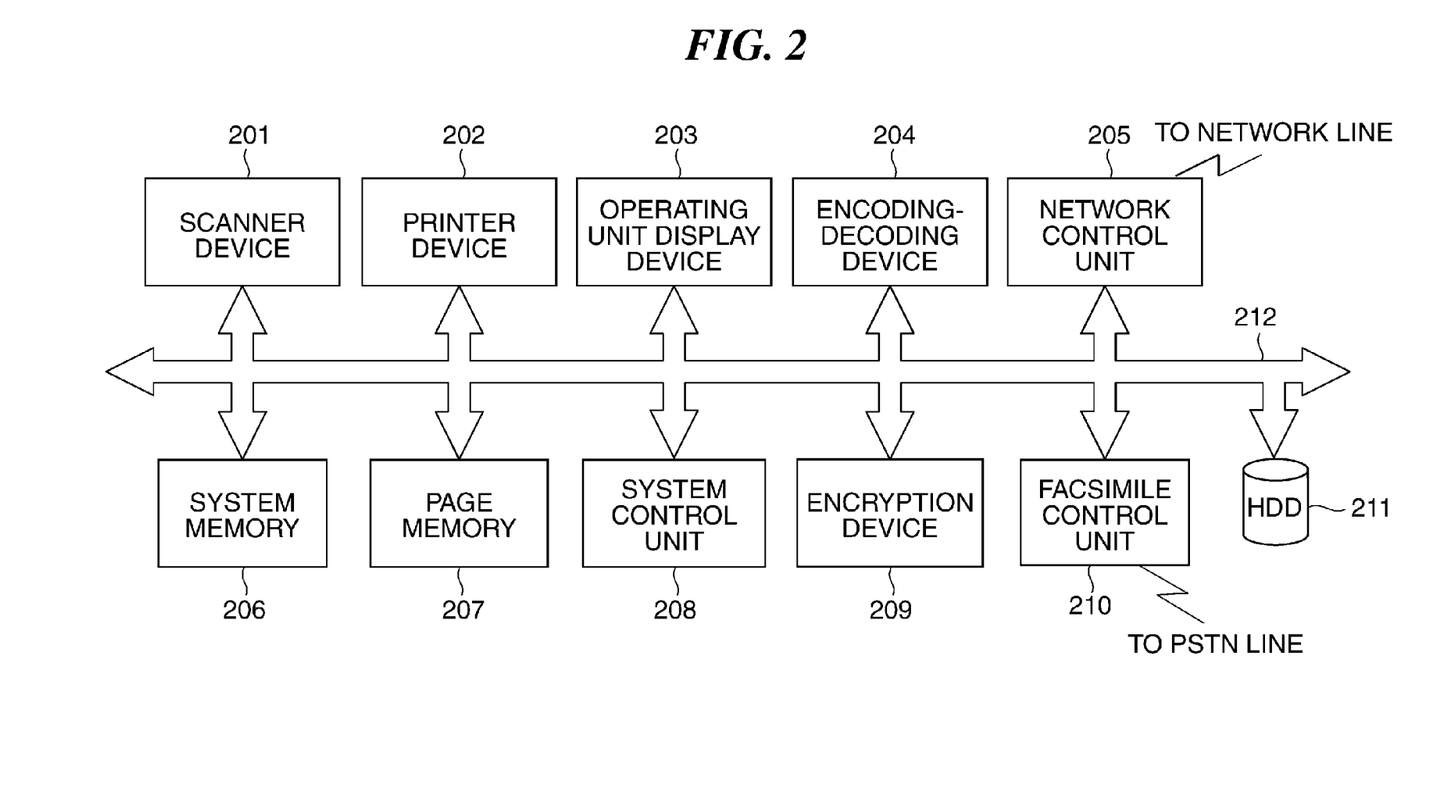
FIG. 2 is a block diagram schematically showing an arrangement of the image communication apparatus.

FIG. 2 is a block diagram schematically showing an arrangement of the image communication apparatus 103. Component elements of the image communication apparatus 103 are connected to one another via a system bus 212. Referring to FIG. 2, a scanner device 201 is a reading device which scans an original in a designated mode (for example, sheet size, resolution, and density). A printer device 202 is a printing device which outputs a document to be printed via a sheet discharging device such as a finisher, not shown. An operating unit display device 203, which has a touch-panel display, is touched by a user to select items within a screen when he or she configures various settings. The operating unit display device 203 also displays, for example, an operating state of the image communication apparatus 103.

An encoding-decoding device 204 encodes and compresses image information, which is to be transmitted, into data, and on the other hand, decodes and decompresses received compressed data to original image information. A network control unit 205 is connected to the network 102 and inputs and outputs information to and from other devices in a network environment. Examples of ways to transmit information using the network 102 include mail transmission, SMB transmission, and FTP transmission. A system memory 206 is comprised of an SRAM unit and a ROM unit. Information to be registered in advance in the image communication apparatus 103 is stored in the SRAM unit, and control programs for the image communication apparatus 103 are stored in the ROM unit.

A page memory 207 is for use in expanding image information of one page when encoding or decoding the same. A system control unit 208 is a microcomputer which includes a CPU and monitors and controls control units, devices, an HDD (hard disk), and so forth in the image communication apparatus 103. To accumulate image data in an HDD 211 or send image data to an external file server, an encryption device 209 encrypts the image data. To accumulate image data in an unencrypted state, the encryption device 209 stores data, which has been encoded by the encoding-decoding device 204, as it is in the HDD 211. To accumulate image data in an encrypted state, the encryption device 209 encrypts encoded data and then stores the encrypted data in the HDD 211. A facsimile control unit 210 is connected to a telephone line such as the PSTN line 104 and is able to carry out communications with other facsimile apparatuses such as the facsimile apparatus 105 via the telephone line. The HDD 211, which is a nonvolatile storage medium, stores received documents, scanned documents, and so forth.

Figure 3:
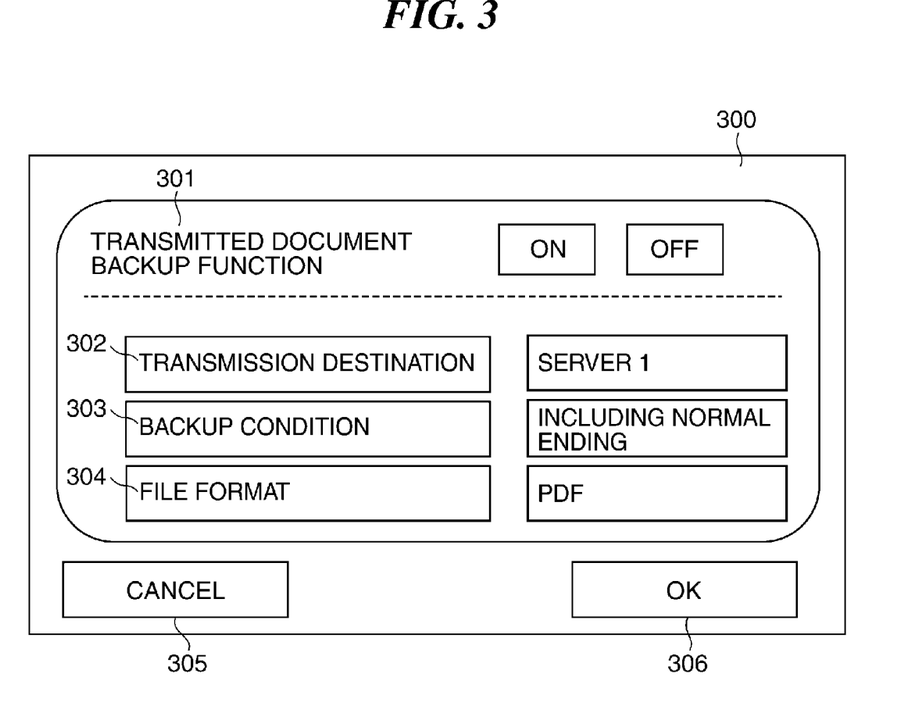
FIG. 3 is a view showing an exemplary transmitted document backup setting screen.

FIG. 3 is a view showing an exemplary transmitted document backup setting screen in a user mode. This transmitted document backup setting screen 300 is displayed on the operating unit display device 203.

Here, the user mode is a mode in which various function settings on the image communication apparatus 103 are configured and registered, and various settings such as transfer settings and address list settings can be configured and registered through user operation. For example, settings described below are allowed to be configured on the transmitted document backup setting screen 300.

A transmitted document backup function 301 is a setting item for selecting whether or not to transmit a backup. Here, transmission of a backup is a process in which a file to be saved (backed up) is generated from faxed image data and transmitted to a designated destination to save. By setting the transmitted document backup function 301 to "ON", a transmitted document backup function is enabled so that a backup can be transmitted after facsimile transmission. When the transmitted document backup function is enabled, settings on a transmission destination 302, a backup condition 303, and a file format 304 on lower lines as well can be configured. Setting the transmitted document backup function 301 to "OFF" disables the transmitted document backup function, and no backup is transmitted.

The transmission destination 302 is a setting item for setting a destination to which a backup is transmitted, that is, a destination to save. For the transmission destination 302, a user sets a backup transmission destination (a destination to save) by selecting an address from an address list registered in advance. The backup condition 303 is a setting item for selecting whether or not to transmit a backup according to a communication result of facsimile transmission. As the backup condition 303, the user can select one of the following: "Always", "Only normal ending", and "Including abnormal ending".

When "Always" is selected, a backup is always transmitted irrespective of a facsimile transmission result. When "Only normal ending" is selected, a backup is transmitted on the condition that transmission to all transmission destinations has normally ended as a result of facsimile transmission. Namely, in facsimile broadcasting to multiple addresses, a backup is transmitted when communication to all addresses has normally ended, but no backup is transmitted when communication to at least one address has been ended with error. When "Including abnormal ending" is selected, a backup is transmitted when communication to at least one address has normally ended. Namely, in facsimile broadcasting to multiple addresses, a backup is transmitted when communication to at least one address has normally ended, but no backup is transmitted when communication to all addresses has been ended with error.

Setting of the backup condition 303 corresponds to setting of a condition regarding how to determine information such as "transmission destination information" to be included in a file name based on a facsimile communication result (to be concretely described later with reference to steps S605 to S609 in FIG. 6). As will be described later, "transmission destination information" indicates a destination of facsimile transmission (a destination address 405 or a group address name 404 in FIG. 4) in a file name of a file that is to be transmitted as a backup.

The file format 304 is a setting item for setting a file format of a backup document that is to be transmitted as a backup. As the file format 304, the user can select "PDF" or "TIFF". When an "OK" button 306 is depressed, the system control unit 208 stores the present transmitted document backup setting in the SRAM unit of the system memory 206 and then exits the transmitted document backup setting screen 300. When a "Cancel" button 305 is depressed, the system control unit 208 exits the transmitted document backup setting screen 300 without storing the present transmitted document backup setting.

In the following description, facsimile transmission from the image communication apparatus 103 to the facsimile apparatus 105 via the PSTN line 104 will be referred to as "first transmission" sometimes. The first transmission includes not only transmission to a single address but also facsimile broadcasting to multiple addresses. Also, in the following description, transmission of a backup from the image communication apparatus 103 to a destination to save such as the file server 101 via the network 102 after the first transmission will be referred to as "second transmission" sometimes.

Figure 4:
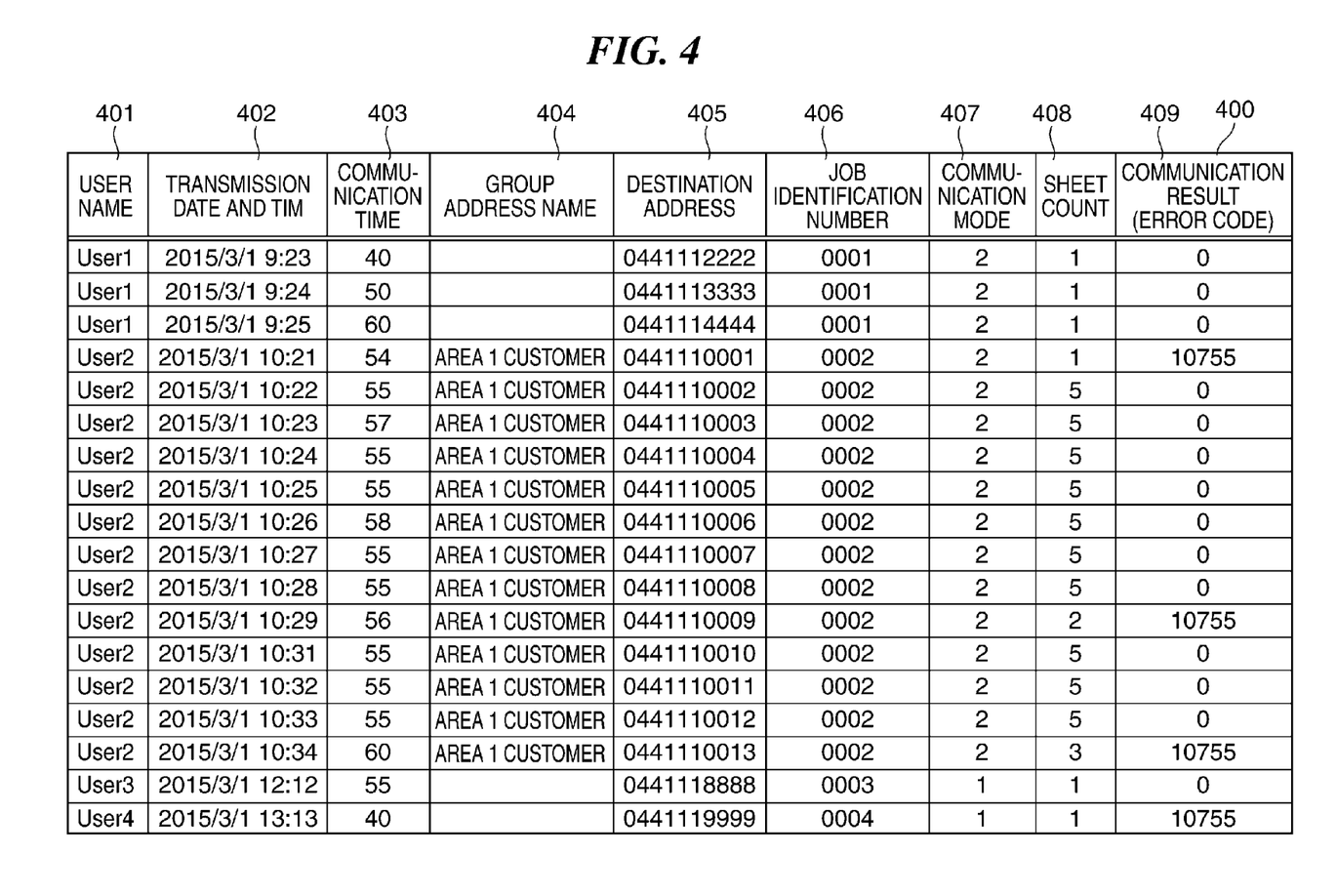
FIG. 4 is a conceptual diagram showing a facsimile transmission history management table.

FIG. 4 is a conceptual diagram showing a facsimile transmission history management table. This facsimile transmission history management table 400 is held in the HDD 211 which is a holding unit. In the facsimile transmission history management table 400, information on a transmission history described below is stored for each of communications in a facsimile transmission job, and up to 2,000 transmission histories are allowed to be stored. One communication means a communication to each address in the case of broadcasting.

In the facsimile transmission history management table 400, user names 401 are areas where a person who submits a job is stored as sender information. Transmission dates and times 402 are areas where a date and time at which communication is started is stored. Communication time periods 403 are areas where a facsimile transmission time period (seconds) is stored. Group address names 404 are areas where in facsimile broadcasting using a group address, name information (for example, area 1 customer) on the group address is stored. Destination addresses 405 are areas where destination information such as a telephone number or an abbreviation of a person on the other end which is a destination. Job identification numbers 406 are areas where a job identification number assigned to each job is stored.

Communication modes 407 are areas where a number indicative of a communication mode is stored. Specifically, for example, 1 is stored for transmission, 2 is stored for broadcasting, 3 is stored for direct transmission, and 4 is stored for timer transmission. Sheet counts 408 are areas where the number of communicated pages is stored. Communication results 409 are areas where a result indicative of normal communication or abnormal communication is stored; 0 is stored for normal ending, and an error code number (for example, 10755) is stored for abnormal ending.

In the present embodiment, information on broadcasting to three addresses (0441112222, 0441113333, 0441114444), for which no group address is designated, by User 1 is stored from the top. Also, information on broadcasting to 13 addresses (0441110001 to 0441110013), for which a group address is designated, by User 2 is stored. Further, information on transmission to one address (0441118888) by User 3 is stored, and information on transmission to one address (0441119999) by User 4 is stored. In this example, the information on transmission to 16 communications in total is stored.

Figure 5:
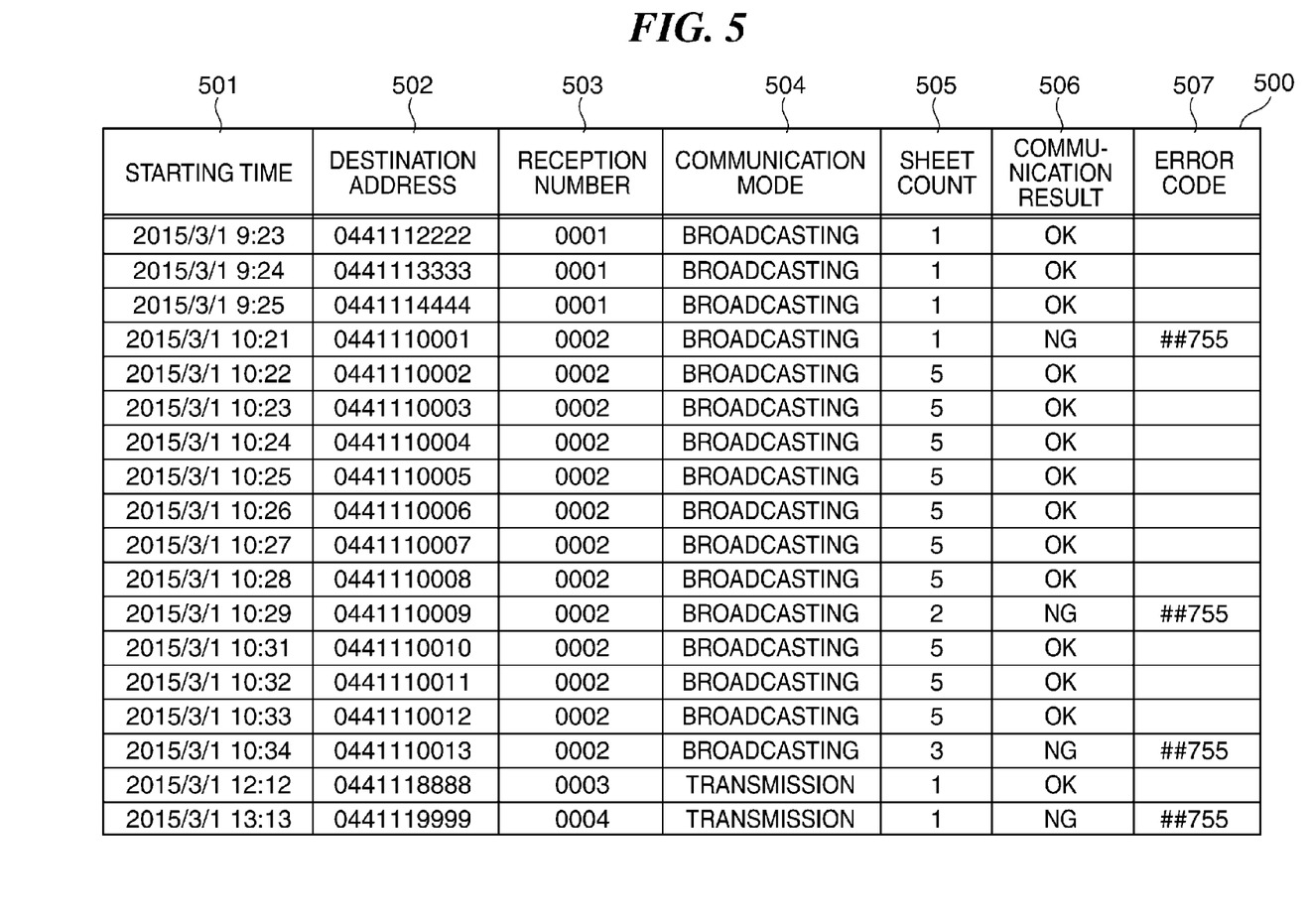
FIG. 5 is a diagram showing a display example of a facsimile transmission history.

FIG. 5 is a diagram showing a display example of facsimile transmission histories. The facsimile transmission histories 500 are displayed on a display unit, not shown, of the file server 101 in accordance with transmission histories stored in the facsimile transmission history management table 400. The system control unit 208 may cause the printing device 202 to print the facsimile transmission histories 500 upon receiving a printing instruction from the operating unit display device 203.

In the facsimile transmission histories 500, information on the transmission dates and times 402 are displayed as starting times 501. Information on the destination addresses 405 is displayed as destination addresses 502. Information on the job identification number 406 is displayed as reception numbers 503. Characters that represent a communication mode are displayed as communication modes 504 in accordance with information on the communication modes 407. Specifically, for example, the system control unit 208 converts numerical value information stored in the communication modes 407 into character string information on communication modes, for example, transmission for 3, broadcasting for 2, direct transmission for 3, and timer transmission for 4, and displays the character string information.

Information on the sheet counts 408 is displayed as sheet counts 505. Characters are displayed as communication results 506 in accordance with information on the communication results 409. Specifically, when a value of the communication result 409 is 0, the word OK is displayed, and when a value of the communication result 409 is not 0, the word NG is displayed. Error codes are displayed as error codes 507 in accordance with information on the communication results 409. Namely, when the communication result 409 is not 0, information on the communication result 409 is converted into an error code and displayed. When an error code number in the communication result 409 is 0, nothing is displayed.

Figure 6:
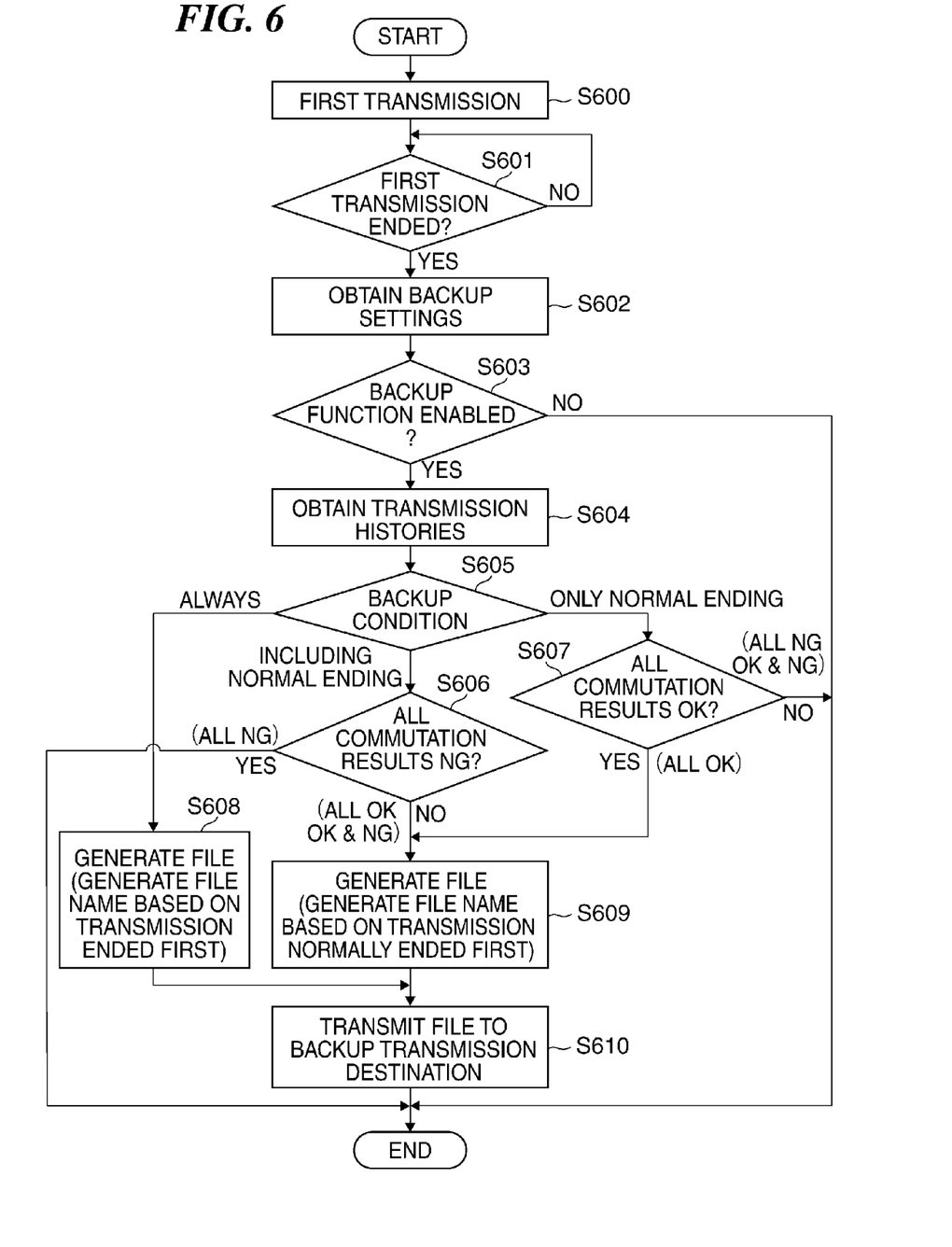
FIG. 6 is a flowchart showing how a facsimile transmission job is processed and how a backup is transmitted.

FIG. 6 is a flowchart showing a process in which a facsimile transmission job is processed, and a backup is transmitted. This process is started in response to submission of a facsimile transmission job and carried out by a CPU of the system control unit 208 reading out a program stored in the ROM unit or the HDD 211 into a RAM, not shown, and executing the same.

Here, a backup is transmitted to the file server 101 on a job-by-job basis. Namely, when a facsimile transmission job for one address is executed, a backup is transmitted after the transmission to that address is completed. When a job of facsimile broadcasting to multiple addresses is executed, a backup is transmitted after transmission to all the addresses is completed.

The system control unit 208 causes the facsimile control unit 210 to start the first transmission, which is facsimile transmission complying with a facsimile transmission job (step S600). Here, the first transmission is performed based on an address setting, original reading setting, and transmission setting received from the user via the operating unit display device 203. Upon receiving a transmitting instruction via the operating unit display device 203 after receiving the address setting, original reading setting, and transmission setting, the system control unit 208 causes the scanner device 201 to read an original. The system control unit 208 then transmits image data of the original read by the scanner device 201 to a designated address.

The system control unit 208 monitors the first transmission started in the step S600 until the first transmission ends (step S601). Here, the system control unit 208 and the facsimile control unit 210 correspond to a first transmission unit of the present invention. When the first transmission is facsimile broadcasting to multiple addresses, the system control unit 208 continues monitoring the first transmission until transmission to all the addresses ends. The system control unit 208 successively accumulates information on transmission histories on a communication-by-communication basis in the first transmission before the first transmission ends. On this occasion, the system control unit 208 assigns the job identification numbers 406 to respective jobs.

When the first transmission ends, the system control unit 208 refers to settings as to backup of a transmitted document in the user mode stored in the SRAM unit of the system memory 206 and obtains backup settings (step S602). The backup settings obtained here include a variety of information on the transmission destination 302, the backup condition 303, and the file format 304 as well as information on a setting on the transmitted document backup function 301 (ON/OFF setting) (FIG. 3).

The system control unit 208 then checks the ON/OFF setting on the transmitted document backup function 301 in the backup settings obtained in the step S602 and determines whether or not the transmitted document backup function 301 is on (enabled) (step S603). As a result of this determination, when the transmitted document backup function 301 is not on, the system control unit 208 ends the process in FIG. 6, and on the other hand, when the transmitted document backup function 301 is on, the process proceeds to step S604.

In the step S604, the system control unit 208 obtains information on transmission histories of the current transmission job from the transmission history management table 400 stored in the HDD 211. For example, when the job identification number 406 of the current transmission job is "0001", transmission histories for three communications by User 1 are obtained. When the job identification number 406 of the current transmission job is "0002", transmission histories for 13 communications by User 2 are obtained.

The system control unit 208 then checks the backup condition 303 in the obtained backup settings (step S605) and causes the process to branch according to whether the backup setting 303 is "Always", "Only normal ending", and "Including normal ending". Namely, when the backup setting 303 is "Always", the process proceeds to step S608, when the backup setting 303 is "Including normal ending", the process proceeds to step S606, and when the backup setting 303 is "Only normal ending", the process proceeds to step S607.

In the steps S608 and S609, the system control unit 208 generates a backup document as a file to be saved (backed up) based on image data transmitted in the current transmission job and generates a file name for this backup document. The system control unit 208 and the network control unit 205 correspond to a generating unit of the present invention. The backup document is generated by the facsimile control unit 210 converting faxed image data into such a format as PDF selected in the file format 304 under the control of the system control unit 208. A description will now be given of file names with reference to FIG. 7.

Figure 7:
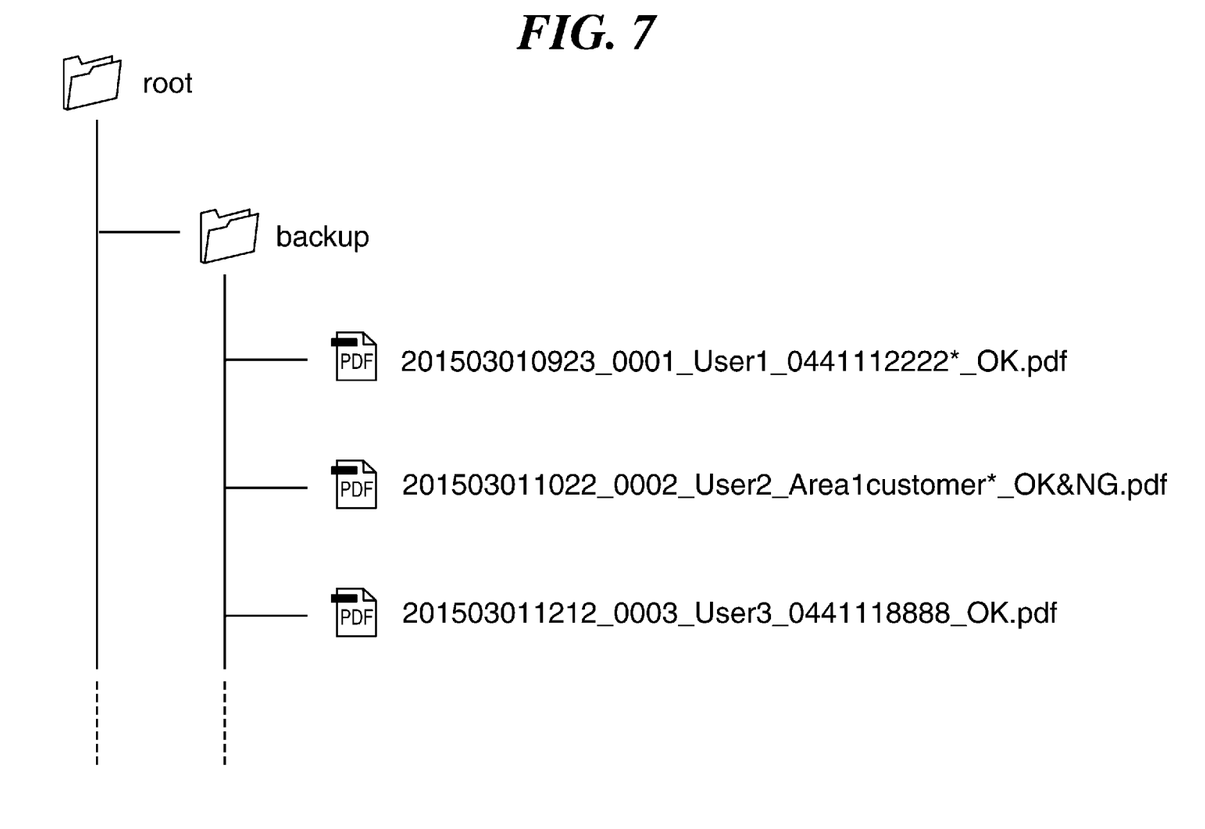
FIG. 7 is a view showing a display example of backup documents displayed by a file server.

FIG. 7 is a view showing a display example of backup documents displayed on the file server 101. The backup documents are, for example, PDF documents. File names of the backup documents include information on a transmission date and time of facsimile transmission, a job identification number that enables identification of a job, sender information on a person who submits a job, transmission destination information indicative of a telephone number or the like of a destination, and information on a result of transmission, and they are arranged in this order.

On a first line in FIG. 7, a file name "201503010923_0001_User1_0441112222*_OK. pdf" is shown. On a second line, a file name "201503011022_0002_User2_Arealcustomer*_OK&NG. pdf" is shown. On a third line, a file name "201503011212_0003_User3_0441118888_OK. pdf" is shown.

As transmission date and time information in a file name, the transmission date and time 402 in the facsimile transmission history management table 400 is set. The display example in the first line in FIG. 7 shows that the transmission date and time information is "201503010923", and the transmission date and time is "nine twenty-three on Mar. 1, 2015". As a job identification number in a file name, the job identification number 406 is set, and the display example in the first line shows that the job identification number is "0001". As sender information in a file name, the user name 401 is set, and the display example in the first line shows that the sender information is "User1".

As transmission destination information in a file name, the group address name 404 is set for facsimile broadcasting using designation of a group address, and otherwise, the destination address 405 is set. The display example in the first line in FIG. 7 shows that, for example, sender information is "0441112222" which is the destination address 405 for one of communications, the job identification numbers 406 of which are the same. Which transmission date and time 402 and destination address 405 to select among communications the job identification numbers 406 of which are the same varies according to which one of the steps S608 and S609 to execute.

A mark indicating that there are multiple addresses designated as transmission destinations for the current job is added to the end of transmission destination information in a file name. In the present embodiment, a mark "*" is used, but this is not limitative. What kind of mark to add may be selected by the user. As result information in a file name, an indication corresponding to the communication results 409 of communications the job identification numbers 406 of which are the same. Specifically, when transmission to all addresses designated as transmission destinations in the current job has normally ended, "OK" is set, and when transmission to all addresses designated as transmission destinations in the current job has abnormally ended (ended with error), "NG" is set. When transmission to some of addresses has normally ended, and transmission to the other ones of the addresses has abnormally ended, "OK & NG" is set.

Referring again to FIG. 6, in the step S608, the system control unit 208 generates a backup document. In this case, it is necessary to always send a backup irrespective of a facsimile transmission result. Accordingly, the system control unit 208 generates a file name for the backup document based on a transmission history of a communication ended first among communications in the current transmission job irrespective of whether it has been normally or abnormally ended.

For example, in the case of broadcasting by User1 to three addresses, for which no group address is designated, such a file name as shown in the first line of FIG. 7 is generated based on the first one of three communications the job identification number 406 of which are "0001" (see FIG. 4). This file name includes transmission date and time information "201503010923", which is the first transmission date and time 402, identification information "0001" which is the job identification number 406, and destination information "0441112222" which is the first destination address 405. Also, the mark "*" is added to the file name because of transmission to multiple addresses.

In the case of broadcasting by User2 to 13 addresses for which a group address is designated, a file name is generated based on the first one (on the fourth line in FIG. 4) among 13 communications the job identification numbers 406 of which are "0002". This file name is "201503011021_0002_User2_arealcustomer*_OK&NG. pdf" although this is not shown in the figure. Namely, even if there is no communication that has normally ended, a transmission history of a communication ended first is reflected. Since a group address is designated for the addresses, "arealcustomer" which is the group address name 404 is included as transmission destination information in the file name. The mark "*" is added to the file name because of transmission to multiple addresses. Since normal ending and abnormal ending are mixed, "OK&NG" is added.

In the case of transmission by User3 to one address, such a file name as shown in the third line of FIG. 7 is generated. In the case of transmission by User4 to one address, a file name "201503011313_0004_User4_0441119999_NG. pdf" is generated although this is not shown in the figure. The word "NG" is added as result information because communication has abnormally ended. The process then proceeds to step S610.

As a result of the determination in the step S605, when the backup condition 303 is "Including normal ending", a backup needs to be transmitted when there is at least one address to which communication has normally ended in the job. Accordingly, first, in the step S606, the system control unit 208 obtains the communication results 409 from transmission histories of the current job in the facsimile transmission history management table 400. Then, as for this job, the system control unit 208 determines whether or not all the communication results 409 indicate abnormal ending (NG), that is, all the communication results 409 are error codes, that is, values other than 0. As a result of this determination, when all the communication results 409 indicate abnormal ending (NG), there is no need to transmit a backup, and hence the system control unit 208 ends the process in FIG. 6. In this case, no backup document is generated. For example, in the case of transmission by User4 to one address, the step S609 is not executed because there is no communication has normally ended.

On the other hand, when the system control unit 208 determines that at least one of the communication results 409 indicates normal ending (OK), the process proceeds to the step S609. In the step S609, the system control unit 208 generates a backup document, and on this occasion, generates a file name of the backup document based on a transmission history of a communication ended first among normally-ended ones of communications in the current transmission job.

For example, in the case of broadcasting by User2 to 13 addresses, a file name is generated based on a communication normally ended first (on the fifth line in FIG. 4) among 13 communications the job identification numbers 406 of which are "0002". As a result, the file names "201503011022_0002_User2_Arealcustomer*_OK&NG.pdf" shown in the second line in FIG. 7 is generated.

In the case of broadcasting by User1 to three addresses for which no group address is designated, such a file name as shown in the first line of FIG. 7 is generated based on a communication normally ended first (on the first line in FIG. 4). In the case of transmission by User3 to one address, a communication to this address was normally ended, and hence such a file name as shown in the third line of FIG. 7 is generated based on a communication normally ended first (on the 17th line in FIG. 4). The process then proceeds to the step S610.

As a result of the determination in the step S605, when the backup condition 303 is "Only normal ending", a backup needs to be transmitted only when transmission to all the transmission destinations has normally ended. Accordingly, first, in the step S607, the system control unit 208 obtains the communication results 409 from transmission histories of the current job in the management table 400. Then, as for the current job, the system control unit 208 determines whether or not all the communication results 409 indicate normal ending (OK), that is, all the communication results 409 is the value 0.

As a result of this determination, when at least one of the obtained communication results 409 indicates abnormal ending (NG), the system control unit 208 ends the process in FIG. 6 because there is no need to transmit a backup. In this case, no backup document is generated. In the example shown in FIG. 4, the communication results 409 indicates abnormal ending (NG) as to both of transmission by User2 and transmission by User4, and hence no backup document is generated without the step S609 being executed.

On the other hand, when the system control unit 208 determines that all of the obtained communication results 409 indicate normal ending (OK), the system control unit 208 executes the step S609. Thus, the system control unit 208 generates a backup document, and on this occasion, generates a file name of the backup document based on a transmission history of a communication ended first among normally-ended ones of communications in the current transmission job. At this time, for example, in the case of broadcasting by User1 to three addresses for which no group address is designated, such a file name as shown in the first line of FIG. 7 is generated based on a first one (on the first line in FIG. 4) of all the three communications normally ended.

In the step S610, the system control unit 208 transmits the backup document generated in the step S608 or the step S609 as a backup to a backup transmission destination registered as a destination to save in the transmission destination 302. According to the setting example in FIG. 3, the backup transmission destination is the file server 101. Under the control of the system control unit 208, the backup document is transmitted to the file server 101 by way of the network control unit 205. Here, FTP (File Transfer Protocol) can be used as a transmission protocol. Also, SMB (Server Message Protocol), WebDAV (Distributed Authoring and Versioning protocol for the WWW), or the like can be used. After that, the process in FIG. 6 is brought to an end.

As shown in FIG. 7, backup documents are displayed on the file server 101. The job identification numbers 406 for identifying jobs are added to file names stored in the file server 101. This enables the user to easily collate with desired facsimile transmission histories 500 (FIG. 5) with the help of the job identification numbers 406.

According to the present embodiment, for each communication, a transmission history including the job identification number 406 (identification information) assigned to each job for which facsimile transmission has been done is held as the transmission history management table 400. The job identification numbers 406 uniquely identify jobs. Whenever a backup document is to be transmitted, the job identification number 406 is added to its file name. As a result, even in the case of broadcasting, a desired transmission history is easily found with the help of the job identification number 406. Therefore, even in the case of broadcasting, visibility is ensured when the content of transmission is checked.

Moreover, a facsimile transmission destination is found by referring to transmission destination information included in a file name. In particular, transmission destination information in a file name is represented by one representative address, not multiple addresses, the file name is not too long. Thus, even in the case of transmission to a single address and in the case of broadcasting, visibility is ensured when the content of transmission is checked.

Also, in the case of facsimile broadcasting using designation of a group address, the group address name 404 is included as transmission destination information in a file name, and hence a history is easily found with the help of a group address for broadcasting. Moreover, in the case of broadcasting, such a mark as "*" is added following the transmission destination information as information for enabling visual reorganization that there are multiple addresses, and hence visibility is improved.

Further, as the backup condition 303, any of "Always", "Only normal ending", and "Including normal ending" is selectable as to whether or not to send a backup according to a commutation result of facsimile transmission. This improves usability.

It should be noted that in the present embodiment, the process is caused to branch according to the backup condition 303 in the step S605 in FIG. 6. However, setting of the backup condition 303 by the user should not always be required, but an across-the-board process that does not require the setting may be determined at default. For example, transmission destination information to be included in a file name may be a transmission destination (the destination address 405 or the group address name 404) to which a communication was ended first in a job. Alternatively, transmission destination information to be included in a file name may be a transmission destination (the destination address 405 or the group address name 404) to which a communication was normally ended first in a job.

Although in the embodiment described above, the job identification number 406 is added to a file name of a backup document even when it is not to be broadcasted, the job identification number 406 may be added to a file name of a backup document only when it is to be broadcasted.

It should be noted that a transmission destination registered in the transmission destination 302 as a destination to save a backup document is not limited to a file server, but may be, for example, another server on a network, a storage, or a box of the image communication apparatus 103.

It should be noted that although in the steps S608 and S609, a backup document is generated, and a fine name thereof is generated, the process is not limited to this procedure. For example, only a file name may be generated in the steps S608 and S609, and when a stage of transmission is reached in the step S610, a backup document may be generated, and a file name may be added to it.

Although in the embodiment described above, it is assumed that the first transmission in the step S600 in FIG. 6 is facsimile transmission (including broadcasting), the first transmission in the step S600 may be e-mail transmission (including broadcasting). When the first transmission in the step S600 is e-mail transmission, e-mail addresses are stored in the destination addresses 405 in FIG. 4 and the destination addresses 502 in FIG. 5. Also, the first transmission in the step S600 may be file transmission (including broadcasting). When the first transmission in the step S600 is file transmission, host addresses of transmission destinations and file paths are stored in the destination addresses 405 in FIG. 4 and the destination addresses 502 in FIG. 5. Further, the first transmission may be transmission of image data to addresses using multiple types of protocols such as facsimile transmission, e-mail transmission, and file transmission.

Moreover, the first transmission in the step S600 is not limited to transmission of image data on an original read by the scanner device 201, but may be transmission of image data read out from the HDD 211.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-134431, filed Jul. 3, 2015, which is hereby incorporated by reference herein in its entirety.

What is claimed is:

1. An image transmission apparatus which is able to designate a plurality of destinations and transmit image data to the plurality of destinations, comprising:
   a memory that stores instructions; and
   a processor that causes, by performing the instructions, the image transmission apparatus to:
   generate a file based on the image data;
   set, in a case where the plurality of destinations is designated and the image data is transmitted to the plurality of destinations, a file name including a certain destination among the plurality of destinations, information for a user to recognize that a plurality of destinations is designated, and an identification information of a job as a file name of the file; and
   store, in a storage, the generated file as a history.

2. The image transmission apparatus according to claim 1, wherein said processor further causes the image transmission apparatus to store the generated file in an external device.

3. The image transmission apparatus according to claim 1, wherein the certain destination among the plurality of designated destinations is a destination to which transmission ended first.

4. The image transmission apparatus according to claim 1, wherein the certain destination among the plurality of designated destinations is a destination to which transmission normally ended first.

5. The image transmission apparatus according to claim 1, wherein a file name further including transmission result information determined based on a transmission result of the image data to the plurality of designated destinations is set as a file name of the file.

6. The image transmission apparatus according to claim 1, wherein a file name further including a user name of a user who instructed transmission of the image data is set as a file name of the file.

7. The image transmission apparatus according to claim 1, further comprising a user interface that sets a condition for storing the generated file as a history.

8. The image transmission apparatus according to claim 7, wherein the certain destination included in the set file name is determined based on the condition set by said user interface.

9. The image transmission apparatus according to claim 1, further comprising a scanner configured to read an original, wherein image data generated by scanning the original by said scanner is transmitted.

10. A control method for controlling an image transmission apparatus which is able to designate a plurality of destinations and transmit image data to the plurality of destinations, the method comprising:
   generating a file based on the image data;
   setting, in a case where the plurality of destinations is designated and the image data is transmitted to the plurality of destinations, a file name including a certain destination among the plurality of destinations, information for a user to recognize that a plurality of destinations is designated, and an identification information of a job as a file name of the file; and
   storing, in a storage, the generated file as a history.

11. A non-transitory computer-readable storage medium storing a program for causing a computer to execute a control method for an image transmission apparatus which is able to designate a plurality of destinations and transmit image data to the plurality of destinations, the control method comprising:

generating a file based on the image data;

setting, in a case where the plurality of destinations is designated and the image data is transmitted to the plurality of destinations, a file name including a certain destination among the plurality of destinations, information for a user to recognize that a plurality of destinations is designated, and an identification information of a job as a file name of the file; and storing, in a storage, the generated file as a history.

* * * * *